Dec. 8, 1970   D. V. HALTER ET AL   3,546,023
STORAGE BATTERY WITH TRANSPARENT TOP AND BAFFLED
HOLES BETWEEN CELLS
Filed Dec. 29, 1966   4 Sheets-Sheet 1
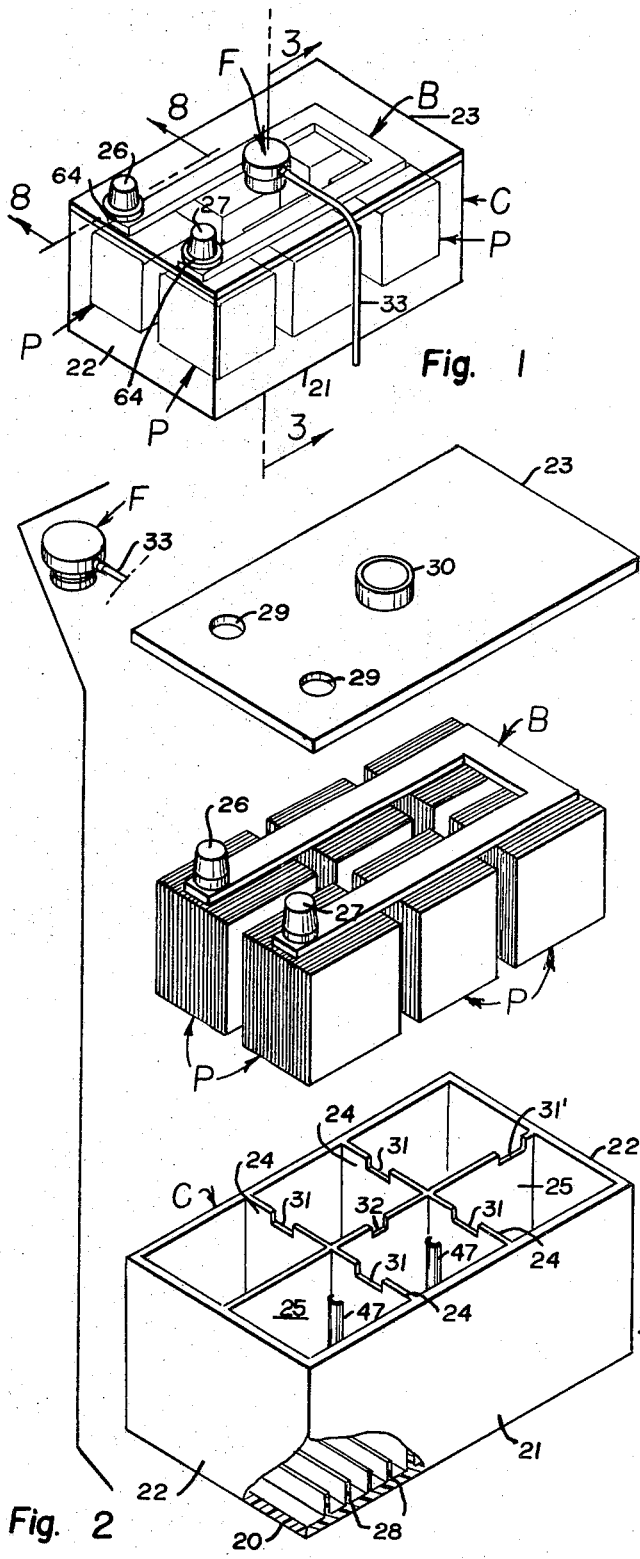
Fig. 1
Fig. 2
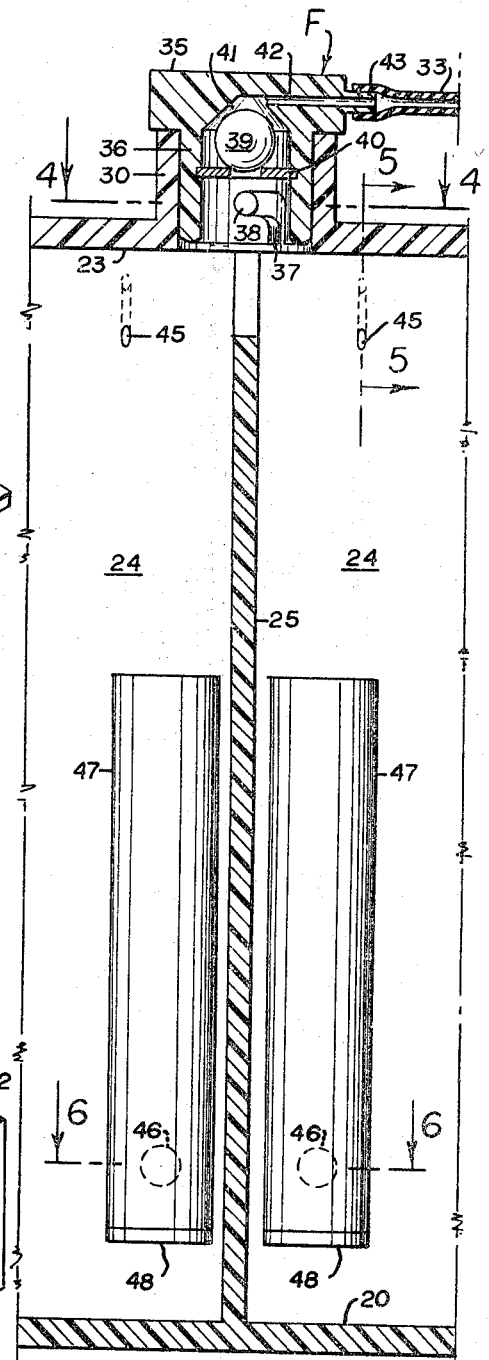
Fig. 3
INVENTORS
Douglas V. Halter
Richard J. Teeter
BY *Van Valkenburgh & Lowe*
ATTORNEYS INVENTORS
Douglas V. Halter
Richard J. Teeter
BY Van Valkenburgh & Lowe
ATTORNEYS INVENTORS
Douglas V. Halter
Richard J. Teeter BY *Van Valkenburgh & Loewe*

ATTORNEYS

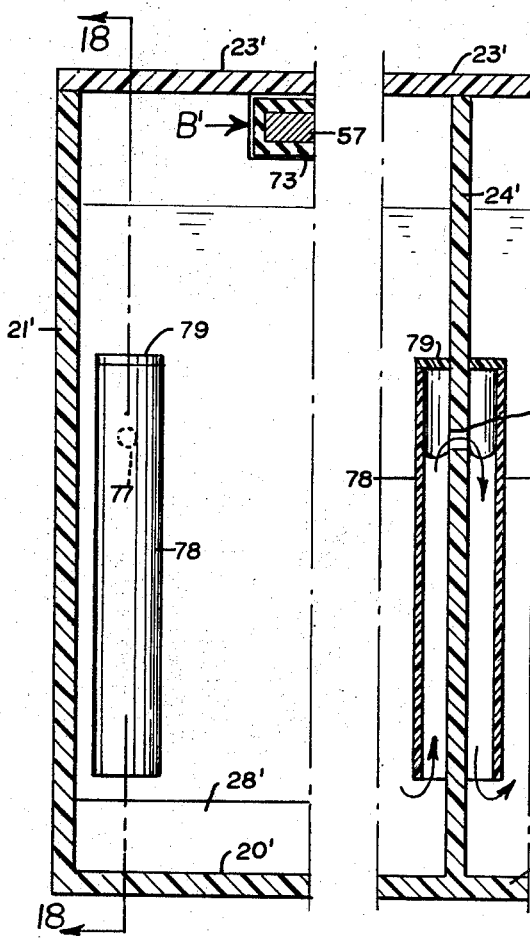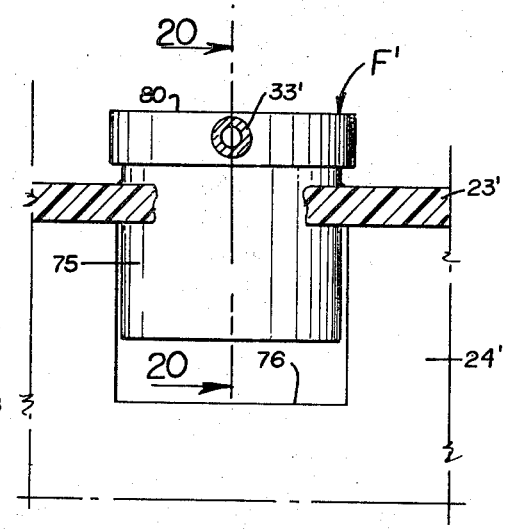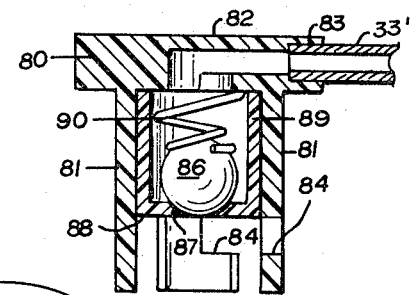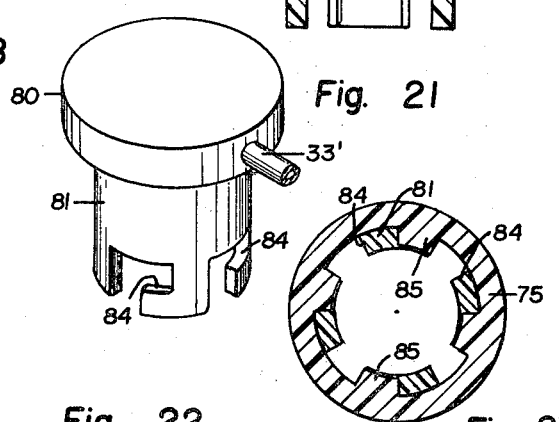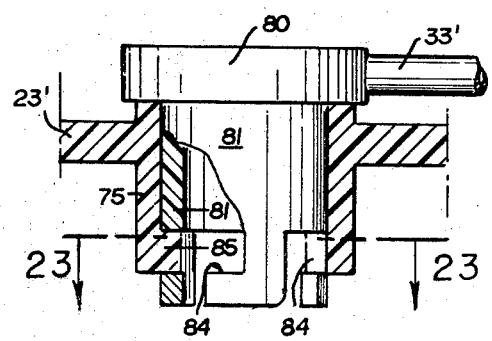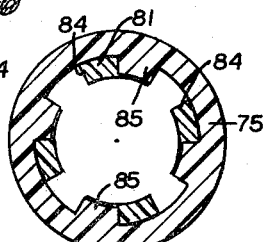

United States Patent Office 3,546,023
Patented Dec. 8, 1970

3,546,023
STORAGE BATTERY WITH TRANSPARENT TOP AND BAFFLED HOLES BETWEEN CELLS
Douglas V. Halter, 112 Park Ave., Cheyenne, Wyo. 82001, and Richard J. Teeter, Box 413, La Porte, Colo. 80535
Filed Dec. 29, 1966, Ser. No. 605,771
Int. Cl. H01m 1/02, 1/06
U.S. Cl. 136—166                12 Claims

ABSTRACT OF THE DISCLOSURE

Storage battery having transparent case and top, single filler cap with valve limiting vapor release and preventing liquid loss on tipping, vent tube from filler cap to remote position, cell partitions molded with case and baffled cell communication holes in partitions, upper vapor holes in partitions, and cell bars encased and accommodated by upper partition slots.

---

This invention relates to improvements in wet cell storage batteries, and more particularly to improvements in the construction of wet cell storage batteries of the type commonly used to provide a six-volt or a twelve-volt source of power for starting the motors of automobiles, trucks and the like or for other purposes. As such, the invention will be hereinafter called a "storage battery."

An object of the invention is to provide a novel and improved storage battery wherein both the cell plate assemblies and the circuit bars interconnecting the plates are fully encased to expose only the terminal connectors.

Another object of the invention is to provide, in a storage battery, a novel and simplified arrangement for filling and maintaining a uniform liquid level in the cell compartments thereof and for protecting the exterior of the battery and its surrounding environment from corrosive fumes and vapors when the battery is in use.

Another object of the invention is to provide a novel and improved housing for a storage battery which is formed of transparent material to provide visual inspection of not only the liquid level, but also any accumulation of material below the plates and the condition of the cell plate assemblies in the individual compartments of the battery, the latter being advantageous not only during use, but also during manufacture.

Another object of the invention is to provide a novel and simplified arrangement for permitting fluid communication between the cells of the battery so that a single filling opening is all that is required and no individual cell will deteriorate because of low fluid level.

Another object of the invention is to provide a novel battery in which pressures above fluid level are transmitted between cells and to a single pressure release opening, to prevent undue pressure building up in any individual cell.

A further object of the invention is to provide in a storage battery an improved and simplified manner of interconnecting the several cell plate assemblies with fully encased and protected circuit bars, all as an interlocking grid structure completely within the battery case.

Other objects of the invention are to provide a novel and improved storage battery construction which is simple in construction, neat in appearance, low in cost, rugged and durable.

With the foregoing and other objects in view, all of which more fully hereinafter appear, our invention comprises certain constructions, combinations and arrangements of parts and elements as hereinafter described, defined in the appended claims and illustrated in the preferred embodiment in the accompanying drawings, in which:

FIG. 1 is an isometric view of a battery constructed according to the principles of this invention;

FIG. 2 is an exploded, isometric view of the components of the battery illustrated in FIG. 1, with a portion of the case being broken away to show certain parts more clearly, it being noted that the case is transparent and all parts thereof are actually visible, but is shown as though non-transparent for clarity of illustration;

FIG. 3 is a fragmentary, transverse, vertical section taken along line 3—3 of FIG. 1, but on an enlarged scale;

FIG. 17 is a fragmentary, vertical section, taken along line 17—17 of FIG. 15, but on an enlarged scale;

FIG. 18 is a fragmentary, vertical section, taken along line 18—18 of FIG. 16;

FIG. 19 is a fragmentary, vertical section, taken along line 19—19 of FIG. 15, but on an enlarged scale;

FIG. 20 is a fragmentary, vertical section, taken along line 20—20 of FIG. 19, with a filling cap shown in full but partially broken away, and with parts of a check valve omitted;

FIG. 21 is a vertical section of the filler cap of FIG. 20 and taken along line 20—20 of FIG. 19;

FIG. 22 is an isometric view of the outside part of the filler cap; and

FIG. 23 is a horizontal section, taken along line 23—23 of FIG. 20.

Figure 4:
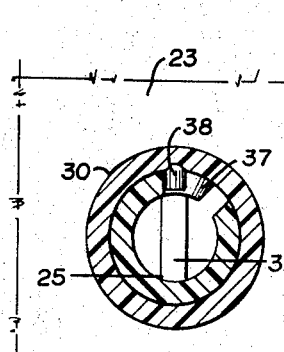
FIG. 4 is a fragmentary, horizontal section taken along line 4—4 of FIG. 3.

The common lead acid storage battery is formed with a plurality of cell plate assemblies wherein anode and cathode plates of lead and lead peroxide are immersed in a sulfuric acid solution. Each cell has a potential of approximately two volts, and storage batteries are ordinarily provided with three or six cells to be rated as six-volt or twelve-volt batteries, respectively. A basic concept of long standing resides in the assumption that each cell compartment must be completely separate from the other to prevent the circulating electrical currents between the cells from discharging the battery when it is not in use. One important discovery concerning the present invention resides in the fact that satisfactory operation and use of the battery is possible even though the liquid in the several cell compartments may flow from one compartment to another. It appears that satisfactory opeartion of the battery is possible, especially where the line of communication from one cell compartment to another is through a circuitous path.

By utilizing this discovery, an improved and simplified storage battery was conceived and developed using, first, an improved and simplified case having an arrangement of all compartments in communication by an efficient, though circuitous, passage system. Such arrangement further permitted the connecting bars between the several cells to be arranged and protectively enclosed, with only the operational terminals and a single liquid filler cap being exposed at the top of the battery.

Referring more particularly to FIGS. 1 and 2 of the drawings, an improved battery of this invention, illustrated as a 12-volt unit, is formed within an open, box-like, transparent case C having a bottom 20, side walls 21 and end walls 22, being closed by a top 23, also transparent. A pair of spaced, transverse, upright partitions 24 and a longitudinal, upright center partition 25 divide the case into six cell compartments, each of which receives one of six conventional cell-plate assemblies P interconnected by a composite U-shaped connection bar B across the top of the cells, as hereinafter further described, and terminating at upstanding terminal posts 26 and 27. Each cell-plate assembly P is adapted to be lowered into a compartment to rest upon a series of transverse, upstanding ribs 28, which provide a sump at the bottom of each cell compartment, as in conventional construction, but each sump is visible from the outside.

The battery case C is formed of acid-resistant, rigid material, whch may be the same as that of a conventional battery case. However, transparent material is preferably used for the case, such as a methacrylate or other suitable type of synthetic resin. The case may be formed by molding, and partitions 24 and 25, as well as ribs 28, are conveniently formed intergrally with the remainder of the case. Top cover 23 may also be molded, as of the same material as the case, to provide holes 29 through which posts 26 and 27 extend, as well a central upstanding, tubular boss 30 receiving a filler cap F. The depth of the case is such as to completely receive the plate assemblies P in their respective compartments and also to receive the bar B. Accordingly, the top edge of each transverse partition 24 is provided with a pair of notches 31 and central partition 24 with a similar notch 31' adjacent the end opposite posts 26 and 27, the notches 31 and 31' being at locations proper to receive the portions of the bar B extending between the plate assemblies. Also, the longitudinal partition 25 has a notch 32 at its center, directly underneath boss 30, for a purpose described below, from which an acid resistant tube 33 extends to a remote position, so that acid fumes will not attack metal parts of an automobile, truck, or the like, adjacent the battery. Top cover 23 may lap over the top edges of the case walls and be secured thereto by a suitable cement, by plastic welding or in any other suitable manner, to form a leak proof connection.

The inlet at boss 30 is normally closed by filler cap F, having, as in FIG. 3, a head 35 from which a short tubular wall 36 depends, to telescopically fit into the inlet boss 30, head 35 being enlarged to fit upon the top of boss 30. The wall 36 has a bayont slot 37, at one or several radially spaced position, each to receive a pin 38 projecting from the inside of the inlet boss 30, as in FIG. 4, to lock the filler cap in place. A float valve ball 39 is retained in the pasageway within the tubular wall 36 by a plastic snap ring 40 which is inserted in a slot provided therefor in wall 36 and also provides a lower seat for the ball. The underside of head 35 is provided with a conical seat 41 for ball 39, with a lateral vent 42 extending from the apex of seat 41 through a nipple 43 to which flexible tube 33 may be attached to complete the cap assembly. In use, vapors emanating from the battery will collect at the filler cap outlet to be discharged through the vent 42 and tube 33. If the battery is tipped or improperly handled to direct liquid into the vapor outlet, the float ball 39 will move against the seating surface 41 to close the outlet and prevent leakage and loss of liquid.

Figure 5:
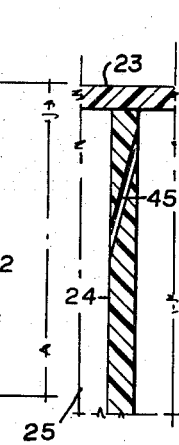
FIG. 5 is a fragmentary, vertical section taken along line 5—5 of FIG. 3.

Notch 32, below the filling opening provided by boss 30 when filler cap F is removed, permits liquid to be added, such as distilled water, when the liquid level is low, as will be visible through the transparent case C or top 23, and to pass to each side of the central partition and into each of the central compartments. Vapor collecting in any end compartment will pass through a vent hole 45, in each transverse partition 24 on opposite sides of center partition 25, into the central compartment on the corresponding side, thence through slot 32 to inside the filler cap F and, if the pressure is sufficient to unseat ball 39, through vent passage 42 for discharge through tube 33. Snap ring 30 may, of course, have a slot at one point, so that ball 39 does not form a seal all the way around the snap ring, but sufficient to reduce to a small amount the flow of vapor. Through the restriction in flow, vapors produced in the battery will usually condense, to drip back into the compartments as liquid. Thus, the battery will lose a minimum of liquid. Holes 45 are preferably slanted, as in FIG. 5, so that liquid will not flow directly from one compartment to the next if the battery is tilted.

Figure 6:
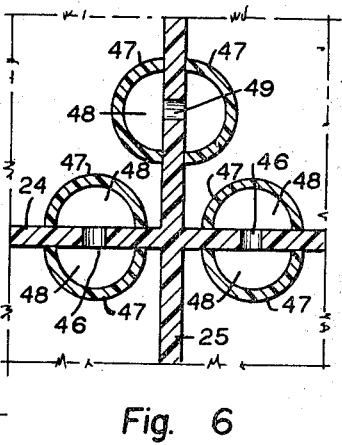
FIG. 6 is a fragmentary, horizontal section taken along line 6—6 of FIG. 3.

In accordance with this invention, the level of fluid is maintained in the compartments by fluid communication between the respective compartments through orifices 46 extending through the interior walls between the compartments and preferably located in a transverse partition, as near the center of the battery and also near the bottom, as in FIGS. 3 and 6. Each orifice 46 is baffled, as by a vertically disposed, half tube 47 mounted upon the partition 24 to extend below the orifice, and also considerably above the orifice. In preferred construction, the length of each tube 47 is approximately one half the height of the compartment, while a half round cap 48 closes the lower end of each tube. Central partition 25, as in FIG. 6, may also be provided with a similar orifice 49, located centrally or adjacent one of the transverse partitions, to insure communication between the two center compartments. Orifice 49 may be baffled on each side by a half tube 47, having the same upward and downward extent as in FIG. 3, and similarly closed at the bottom by a cap 48. The baffles 47, closed at the bottom, permit the liquid level in the compartments to equalize, but only, in effect, by overflowing the tubes 47. Of course, the preferred or normal level of liquid is above the tops of tubes 47, as at a line marked or engraved on the inside of side walls 21 and end walls 22 of the battery case. Thus, the tubes 47 will normally be full of battery liquid. However, the circuitous path between adjacent compartments, provided by the tubes 47 closed at the bottom and orifices 46 or 49 located near the bottom of the tubes, has been sufficient to prevent current flow between cells from short circuiting any cells. Nevertheless, in the event that the current leakage between cells or what is termed "self-discharge" is sufficiently low that neither the operation nor the life of the battery is impaired, the baffling of the communication orifices may be eliminated.

As will be evident, fluid added through boss 30 will flow into the center compartments and flow from each center compartment to each end compartment on that side. Also, if one cell should temporarily consume an undue amount of battery fluid, that cell will automatically receive fluid from the remaining cells, which will prevent a single cell from becoming damaged through loss of fluid. If the amount of fluid used, as determined by periodic inspection, is unexpectedly great, then the battery should be removed and examined for the cause. Other advantages of the arrangement described above reside in the fact that water may be added to the battery through a single opening and in the fact that corrosive vapor and possibly splash will be vented from the opening in the top which is connected with the tube 33 for discharing the vapors at a remote selected location. With this arrangement, the top of the battery should remain comparatively clean, being free of corrosive acids from the interior thereof.

Figure 7:
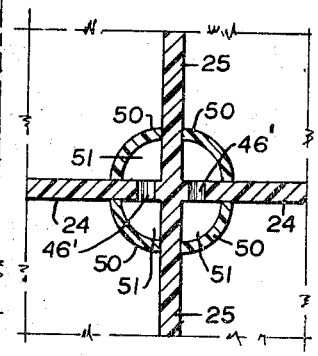
FIG. 7 is a fragmentary, horizontal section similar to FIG. 6 but illustrating an alternative construction.

A modified formation of the orifices connecting the compartments is illustrated in FIG. 7. wherein a pair of orifices 46' are located close to the juncture between a transverse partition 24 and the longitudinal partition 25, near the bottom of each partition 24, and an orifice 29' in partition 25 close to one partition 24. Each set of orifices may be baffled by placing quarter tubes 50, each closed at the bottom by a cap 51, in each of the four corners of the juncture between the longitudinal partition and each transverse partition. This arrangement has the advantage of being more compact than the half tube system, thereby providing a greater clearance for the plate assemblies to be set into the battery. Both half tubes 47 of FIG. 6 and the quarter tubes 50 of FIG. 7 may be attached to the respective partitions by an acid proof cement, by plastic welding, or in any other suitable manner, while bottom caps 48 and 51 may be intially formed integrally with tubes 47 or 50, or attached thereto and to the partitions in a similar manner.

Figure 8:
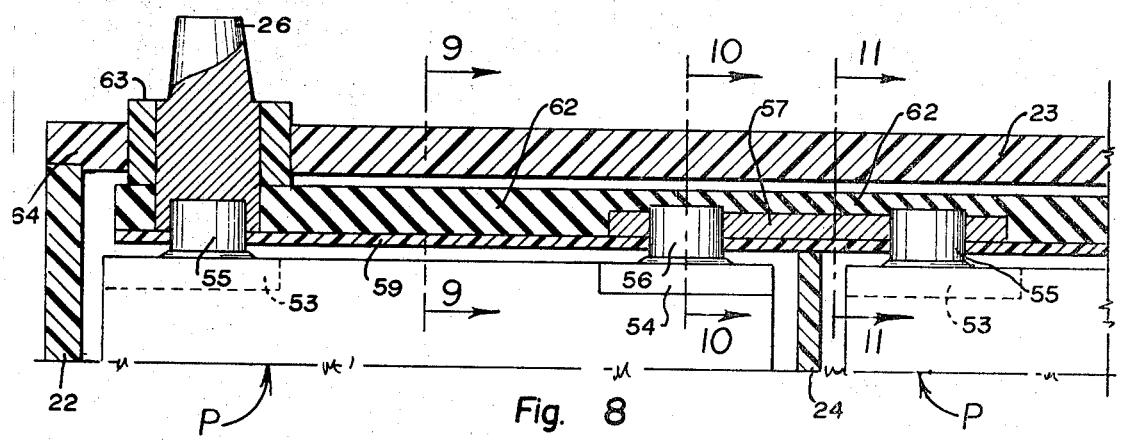
FIG. 8 is a fragmentary, longitudinal section of a portion of an interconnecting grid, taken along line 8—8 of FIG. 1 but on an enlarged scale.
Figure 9:
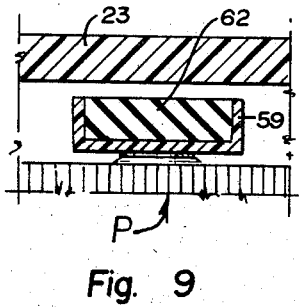
FIG. 9 is a fragmentary, vertical section taken along line 9—9 of FIG. 8.
Figure 10:
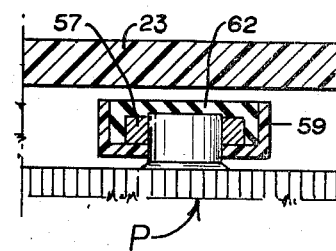
FIG. 10 is a fragmentary, vertical section taken along line 10—10 of FIG. 8.
Figure 11:
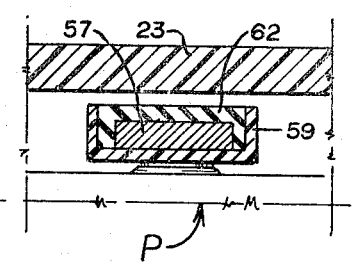
FIG. 11 is a fragmentary, vertical section taken along line 11—11 of FIG. 8.
Figure 12:
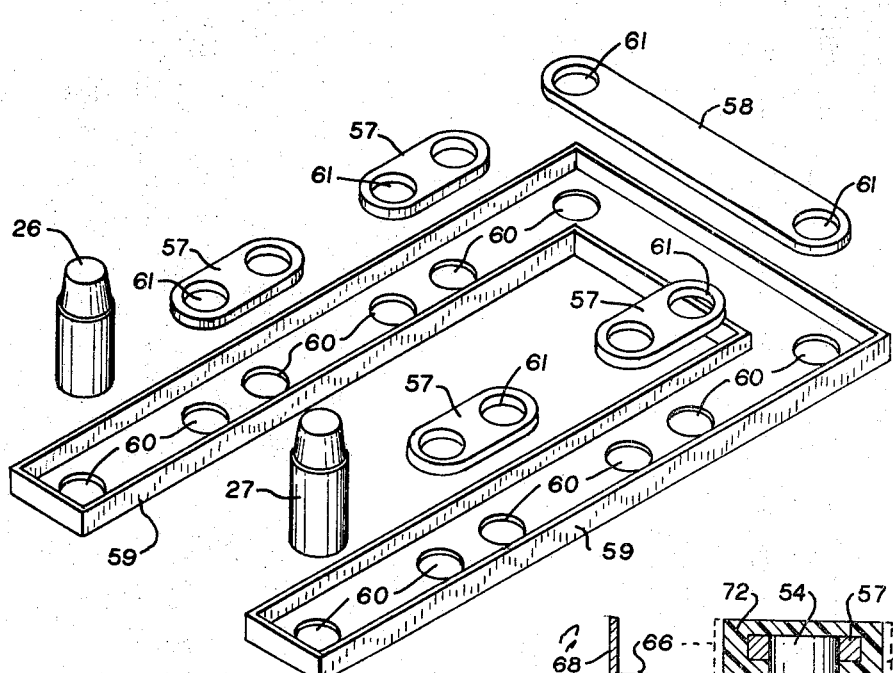
FIG. 12 is an isometric, exploded view of the components forming the interconnecting grid for the several battery cells, before the components are encased in a suitable matrix.

The U-shaped connecting bar B is formed as a continuous, rectangular structure interconnecting the cell plate assemblies and holding them in position. Each cell plate assembly, formed by a plurality of lead and lead peroxide plates separated by suitable plate separators in a conventional manner, includes further a pair of spaced apart plate bars 53 and 54, as in FIG. 8, with one connected to the lead plates and the other to the lead peroxide plates and the opposite plates cut away to accommodate the plate bars. Each plate bar may also be provided with an upstanding cell post 55 and 56, respectively, which is connected to a lead connecting bar 57 or 58 of FIGS. 8 and 10–12, by which each cell is connected to the next, except the cell posts 55 and 56 beneath terminal posts 26 and 27, which are directly connected to the latter. In accordance with this invention, the connecting bar B is formed so that each cell connecting bar and the lower end of each terminal post is encased within an acid proof resin. For this purpose the cell plate assemblies are aligned longitudinally and laterally, as in FIG. 2, then a generally U-shaped, resin channel 59, of FIG. 12, having holes 60 adapted to fit snugly over each of the cell posts 55 and 56, is placed over the posts. The cell bars 57 and 58, which need only be sufficiently long to extend from one cell post to the next and have holes 71, as shown, for fitting over the cell posts, are placed in position. Terminal posts 26 and 27 may also be placed in position and they, as well as cell bars 57 and 58, are fused to the respective cell posts, as by melting through heat produced by flame, electrical resistance or induction. The channel 59 is then filled with a hard setting matrix 62 of a suitable waterproof, acid proof resin, as in FIGS. 9–11, to form the entire bar as a rigid member with the metal portions being encased within the resin material.

The plate assemblies P, with bar B attached thereto, may then be lowered into case C until the plates rest on ribs 28 of FIG. 2. It will be noted that the transparency of case C permits the cell plates to be seen, so that inspection will determine whether any plates, separators, or the like have been damaged during assembly. For more adequate support of the terminal posts 26 and 27, a collar 63, which extends upwardly above top cover 23, may be attached to the top within each hole 28 by a suitable adhesive or molded integrally with the top.

After the plate assembly P and bar B have been placed in the case C, the top cover 23 may be slipped into position and cemented or fused to the upper edges of the case. As in FIG. 8, a shoulder 64 spaced from the edge of top cover 23 a distance corresponding to the thickness of the side and end walls of case C will not only assist in more accurately placing the top in position, but also in applying a cement to join the case and top.

Figure 14:
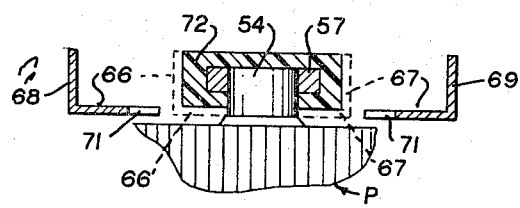
FIG. 14 is a fragmentary, isometric view of the split mold members used in encasing the grid in the manner illustrated in FIG. 13.
Figure 13:
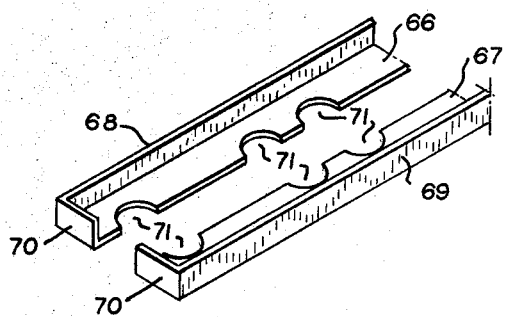
FIG. 13 is a fragmentary, vertical section similar to FIG. 10 but illustrating an alternate method of forming the grid structure, as with a split mold, the mold members being shown spaced apart at each side of the grid and with dotted lines indicating the position of the mold members while the grid structure is encased.
Figure 16:
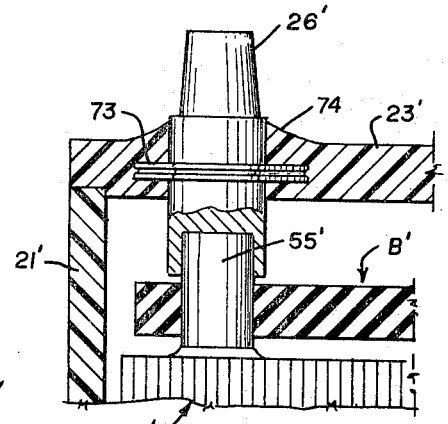
FIG. 16 is a fragmentary, vertical section, taken along line 16—16 of FIG. 15.

An alternate manner of forming the U-shaped connector bar B between the cell plate assemblies is shown in FIGS. 13 and 14, in which longitudinally split molds, divided in such a manner as to be removable after the resin has set, are utilized. Thus, as in FIG. 13, the mold comprises sets of two U-shaped, angular halves 66 and 67, the former having an inner flange 68 corresponding to the inside of bar B, and the latter an outside flange 69 corresponding to the outside of bar B, with each having a short flange 70, as shown at the end. A pair of mold halves for each of the three legs of bar B is conveniently utilized. Each mold half 66 and 67 is also provided with a series of semicircular notches 71 in positions corresponding to cell posts 55 and 56, so that when the mold halves are abutted, as in the dotted position of FIG. 14, opposed notches will surround each of the cell posts. In connecting the terminal posts 26 and 27 and the cell bars 57 and 58 to the upstanding cell posts, both mold halves are supported in abutting relation somewhat above the plate assemblies P, as in FIG. 13. Then, the terminal posts and cell connecting bars are positioned on the cell posts and fused thereto, after which a suitable resin material 72 is poured into the mold and about the cell posts and cell bars. When the pouring of the matrix is completed and the resin set and rigidified, the split molds are removed, as by movement from the dotted to the full position of FIG. 13. As will be evident, this modification reduces the cost of the battery, when made on a production basis.

In the alternative battery construction illustrated in FIGS. 15–23, the battery is a six cell, 12-volt battery, but with the cells in line. Thus, a series of aligned plate assemblies P' are installed in an elongated case C' having a bottom 20', side walls 21' and end walls 22', as in FIGS. 15–17. The case C' is conveniently molded, with transverse partitions 24' and upstanding bottom, sump forming ribs 28' molded integrally therewith. A top cover 23' corresponds in shape to the exterior of the case and is attached thereto in a suitable manner, as by cement or plastic welding, after the parts have been assembled. Terminal posts 26' and 27' extend upwardly from the top cover 23', but at a position adjacent each end and toward one side of the battery, while the cell posts corresponding to cell posts 55 and 56 of FIG. 8 may alternate from side to side, with a corresponding alternation in connecting bars, similar to bars 57 of FIG. 12, which are encased in plastic in a pair of bar connectors B' in a manner similar to that described previously in connection with FIGS. 8–12 or in connection with FIGS. 12 and 14. The cell posts beneath terminal posts 26' and 27', such as cell post 55' of FIG. 16, extend above the connector bar B', so that the terminal posts may be molded in the top 23' and later attached to the cell posts. Each terminal post may be provided with an integral flange 73 which is hexagonal, as shown, or have other noncircular shape, and located at about the center of thickness of the top, to resist turning of the post when the post is connected to or disconnected from a battery cable. The peripheral edge of flange 73 may also be grooved, as shown, to insure an interlocking of the plastic of top 23' therewith. The molding and interlocking of the terminal post with the top minimizes the possibility of damage to the connection between a terminal post and a cell post. To minimize the possibility of damage to top 23' while a battery cable is being connected to or disconnected from a terminal post, top 23' may be provided with an upwardly extending fillet 74 surrounding the terminal post. As will be evident, the terminal posts 26 and 27 of the previous embodiment may be connected to the cell posts in a similar manner.

A filler cap F' is connected to a vent tube 33' and is removably mounted in a boss or collar 75 which, as in FIG. 19, extends above the top cover 23' a short distance, but below the top cover a greater distance. The collar 75 is located directly above the central, transverse partition 24', as in FIG. 18, and is disposed within a notch 76 in that partition. All of the transverse partitions are, of course, provided with notches in the top similar to notches 31 of FIG. 2, receiving the bar connector B'. Also, each of the cells or compartments are connected at their upper ends above the liquid level, which corresponds to a liquid level line above connector bars B' and preferably engraved or molded on the inside of the case C', for equalizing the pressure of vapors produced in any of the cells to the center of the battery, such connections being through slanted holes similar to hole 45 of FIG. 5, but placed adjacent the center of the battery.

Figure 15:
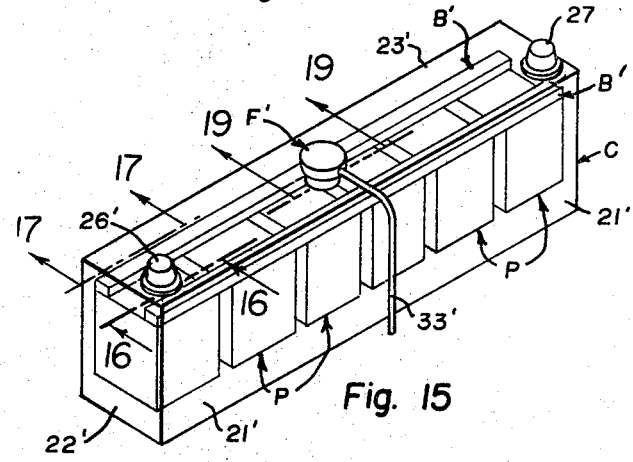
FIG. 15 is an isometric view of a storage battery also constructed in accordance with this invention, having six cells in line.

Fluid communication between the cells is also utilized in the battery of FIG. 15, so that only one filling opening is necessary, but a circuitous route for the movement of liquid from one cell to the next is provided, if necessary. Thus, a hole 77 through each transverse partition 24', as in FIGS. 17 and 18, is located adjacent one side wall 21', such as that opposite the terminal posts 26' and 27', in order to conserve space for reception of the plate assembly P'. Each hole 77 may be about midway of the total height of the partition and baffled by a half tube 78 on each side of the partition, each half tube 78 extending a short distance above the corresponding hole 77, but downwardly to a position near the upper edges of bottom ribs 28'. The upper end of each half tube 78 is closed by a semicircular cap 79, which may be formed integrally with the corresponding tube 78, or may be attached thereto, after the tube 78 is attached to the partition, as by cementing or by plastic welding. As in FIG. 18, it will be noted that an air space will normally form in the upper end of each half tube 78 above hole 77, which tends to restrict liquid communication between the cells, except when the level of one cell is greater than that of the next cell and liquid overflows through the hole 77. This is a further advantage in preventing any short circuits between cells.

A further alternative filler cap F' is illustrated in greater detail in FIGS. 19–23, having an enlarged head 80 adapted to fit against the upper edge of collar 75, and a circular, depending wall 81, when installed extending below the bottom of collar 75, as in FIG. 20. A vent opening 82 leads from the underside of head 80 to a socket 83, in which vent tube 33' may be installed, as by cement or plastic welding. The lower end of depending wall 81 is provided with a series of rectangular bayonet slots 84, such as four in number, adapted to cooperate with a series of correspondingly spaced, inwardly extending lugs or ears 85, conveniently integral with the lower end of collar 75, as in FIGS. 20 and 23. As will be evident, the filler cap may be inserted within the collar and past the lugs 85, then twisted for less than a quarter turn, to lock the filler cap into position. For removal, a reverse twist and upward withdrawal is all that is necessary.

Any splashing or overflow of liquid is prevented by a ball valve 86 adapted to seat against the edge of a central circular opening 87 in a lower flange 88 of a thimble 89, which is inserted within wall 81 at the time of assembly of the filler cap, and attached to the wall, as by cement or plastic welding. A conical coil spring 90 is selected to have a sufficient force to hold the ball 86 against its seat during normal splashing, or even the pressure of liquid, if the battery should be overturned. However, if excessive vapor pressure should be produced within the battery, the force thereof will unseat ball 86 and permit the vapors to be vented through tube 33', to a selected position remote from the battery, so that the corrosive fumes will not adversely affect metal parts or plastics which are not resistant to such corrosive fumes. As before, except when vapor pressure is relieved, the vapors tend to condense and the condensed liquid to drain back into the cells, thus conserving battery liquid.

As will be evident, a battery constructed in accordance with this invention fulfills to a marked degree the objects and requirements hereinbefore set forth. The circuit or cell bars interconnecting the cell plate assemblies are fully encased, with only the terminal posts exposed and the encasement preferably below the liquid level, since the connection between cells is close to the cell plates, rather than extending through the top, as in a conventional battery. Both the case and the top of the battery are preferably transparent, so that not only may the liquid level within the battery be observed readily, but also any collection of material in the sump of any cell. The ribs upstanding from the bottom of the case not only form a sump, but also provide a support for the plate assemblies. The encasement of the cell bars within an acid resistant plastic not only protects the cell connecting bars, but also rigidifies the entire plate assembly structure. The fluid communication holes between cells permit a single filling opening to be utilized, with the accompanying convenience of removing only one filler cap for replenishing the liquid, and also may be baffled to provide a circuitous route for liquid flowing between cells, thereby avoiding any short circuit between cells. The upper holes in the partitions between cell compartments which slant upwardly, so that liquid normally does not pass therethrough, permit vapor or fumes produced in any cell to be transmitted to the filling opening, for release, if necessary, through a vent arrangement and a tube which will lead the fumes to a place of discharge at which they will be least noxious. A valve in the single filler cap, which will relieve extreme vapor pressure but normally causes vapors to be retained in the battery, permits vapors to condense and thereby minimizes loss of liquid. The same valve also prevents loss of liquid, in the event the battery is overturned. Due to the visibility of the liquid from either side or end of the battery, a series of batteries of this invention may be placed in a relatively inaccessible position, as on a bus, tank or other military vehicle, where periodic inspection may be made without removing any filler caps, and from either end or one side of the battery. In fact, an experimental battery of this invention has been tested in rugged military use over a ten month period with complete success.

Although more than one embodiment of this invention and several variations of certain parts of the battery have been illustrated and described, it will be understood that other embodiments may exist and that other changes may be made, all without departing from the spirit and scope of this invention.

What is claimed is:

1. A storage battery comprising:
   a plurality of cell plate assemblies having alternating anode and cathode plates and upstanding cell posts connected to alternate plates;
   a case having upright partitions forming compartments for said cells for containing an electrolyte liquid;
   a top for said case and sealed thereto, said case and top being formed of transparent material;
   a pair of terminal posts extending through said top;
   a series of bars beneath said top connecting said cell posts in alternate series; and
   means separate from said top enclosing said bars and a portion of said cell posts, said means being resistant to said electrolyte liquid.

2. A storage battery as defined in claim 1, including: notches in the upper edges of said partitions through which said bars and said enclosing means extend.

3. A storage battery as defined in claim 1, wherein: said means enclosing said bars includes a normally upwardly open channel through which said cell posts extend upwardly; and a matrix of electrolyte resistant material disposed in said channel and enclosing said bars.

4. A storage battery as defined in claim 1, wherein: said means enclosing said bars comprises a matrix material molded around said bars and the upper portions of said cell posts.

5. A storage battery as defined in claim 1, wherein: said top for said case is provided with a single filling opening;

a filler cap is removably mounted in said opening;

a tube extends from said filler cap to a remote position; and said partitions are provided with means for liquid communication between said compartments.

6. A storage battery comprising:

a plurality of cell plate assemblies having alternating anode and cathode plates and upstanding cell posts connected to alternate plates;

a case having upright partitions forming compartments for said cells for containing an electrolyte liquid;

a top for said case having a single filling opening;

a pair of terminal posts extending through said top;

means for electrically connecting said cell posts in alternate series and with said terminal posts; and means, including orifices in said partitions and baffle means opposite said orifices, providing a circuitous liquid communcaton path between adjacent compartments.

7. A storage battery as defined in claim 6, wherein: said orifices are disposed in said partitions adjacent the bottom thereof; and said baffle means includes upright baffle tubes enclosing said orifices, attached to the corresponding partition and closed at the bottom.

8. A storage battery as defined in claim 6, wherein: said baffle tube are half round.

9. A storage battery as defined in claim 6, wherein: said upright partitions include both longitudinal and transverse partitions; and said baffle tubes are quarter round tubes disposed at the junctions of longitudinal and transverse partitions.

10. A storage battery as defined in claim 6, wherein: said orifices are disposed at an upper position in said partitions; and said baffle means includes baffle tubes enclosing an orifice on each side of a partition, closed at the top and extending to the lower portion of the corresponding partition.

11. A storage battery as defined in claim 6, wherein: said filling opening is provided with a collar extending both above and below said top; and a filler cap is removably mounted in said boss and having bayonet slot means cooperating with inward projections in the lower end of said collar, a vent passage connected to a tube for leading vapors to a remote position, a thimble having a valve seat mounted within said cap, a ball within said thimble for engaging said seat, and a spring normally holding said ball against said seat.

12. A storage battery as defined in claim 6, wherein: said case and top are formed of transparent material;

said upright partitions are formed integrally with said case and the bottom of said case is provided with a series of upstanding ribs forming a sump and a support for said cell plate assemblies;

a filler cap is removably mounted in said filling opening and provided with a vent tube for discharging vapors to a remote posiiton;

the upper edge of said partitions are provided with notches;

a series of bars below said top connect said cell posts in alternate series and are encased in an electrolyte resistant matrix, said encased bars extending through said notches; and one of said notches is disposed directly beneath said filling opening for directing fluid to the compartments on each side of the corresponding partition.

References Cited

UNITED STATES PATENTS

| | | | |
|---|---|---|---|
| 451,445 | 5/1891 | Aldrich | 136—166 |
| 3,388,007 | 6/1968 | Fiandt | 136—162.5 |
| 935,957 | 10/1909 | Blossom | 137—43 |
| 1,316,035 | 9/1919 | Hazelett | 136—177 |
| 1,907,420 | 5/1933 | Finn | 136—134 |
| 2,065,783 | 12/1936 | Woodbridge | 136—178 |
| 2,481,558 | 9/1949 | Appel | 136—166 |
| 2,530,539 | 11/1950 | Raney | 136—177 |
| 3,253,962 | 5/1966 | Deprill | 136—166 |
| 3,311,504 | 3/1967 | Johnson | 136—86 |

FOREIGN PATENTS 647,630 12/1950 Great Britain.

FOREIGN PATENTS

Modern Plastics, p. 156 (June, 1949).

Vinal, Storage Batteries, pp. 81–82 (4th ed. 1955).

WINSTON A. DOUGLAS, Primary Examiner

P. D. ROSEWBERG, Assistant Examiner

U.S. Cl. X.R.

136—178

UNITED STATES PATENT OFFICE
CERTIFICATE OF CORRECTION

Patent No. 3,546,023 December 8,

Douglas V. Halter et al.

It is certified that error appears in the above identified patent and that said Letters Patent are hereby corrected as shown below:

Column 3, line 8, "opeartion" should read -- operation line 69, "bayont" should read -- bayonet --. Column 9, lines 3 and 39, claim reference numeral "6", each occurrence, should r -- 7 --; line 38, "tube" should read -- tubes --.

Signed and sealed this 30th day of March 1971.

(SEAL)
Attest:

EDWARD M. FLETCHER, JR.
Attesting Officer

WILLIAM E. SCHUYLER
Commissioner of Pat